US012373076B1

(12) United States Patent
Denton et al.

(10) Patent No.: US 12,373,076 B1
(45) Date of Patent: Jul. 29, 2025

(54) INTERFACE TO DISPLAY MEDIA COLLECTIONS

(71) Applicant: Snap Inc., Santa Monica, CA (US)

(72) Inventors: Trevor Denton, Santa Monica, CA (US); Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 799 days.

(21) Appl. No.: 16/135,881

(22) Filed: Sep. 19, 2018

(51) Int. Cl.
G06F 3/0481 (2022.01)
G06F 3/04842 (2022.01)
H04L 51/52 (2022.01)

(52) U.S. Cl.
CPC ........ *G06F 3/0481* (2013.01); *G06F 3/04842* (2013.01); *H04L 51/52* (2022.05)

(58) Field of Classification Search
CPC .... G06F 3/0481; G06F 3/04842; G06F 3/048; H04L 51/32
See application file for complete search history.

(56) References Cited

U.S. PATENT DOCUMENTS

| | | | | |
|---|---|---|---|---|
| 9,756,091 | B1 * | 9/2017 | Davies | H04L 65/1089 |
| 10,163,173 | B1 * | 12/2018 | McKinley | G06F 3/0484 |
| 10,445,921 | B1 * | 10/2019 | Li | G06T 13/80 |
| 2007/0250791 | A1 * | 10/2007 | Halliday | G06Q 10/10 |
| | | | | 715/808 |
| 2012/0066573 | A1 * | 3/2012 | Berger | H04N 1/00196 |
| | | | | 715/202 |
| 2013/0111512 | A1 * | 5/2013 | Scellato | H04L 67/18 |
| | | | | 725/14 |
| 2014/0096041 | A1 * | 4/2014 | Gowen | G06F 3/0484 |
| | | | | 715/753 |
| 2014/0181157 | A1 * | 6/2014 | Houston | G06F 16/22 |
| | | | | 707/812 |
| 2014/0282011 | A1 * | 9/2014 | Dellinger | G06F 3/0485 |
| | | | | 715/731 |
| 2017/0026528 | A1 * | 1/2017 | Kim | G06F 16/5838 |
| 2018/0095606 | A1 * | 4/2018 | Chae | H04L 51/32 |
| 2019/0147305 | A1 * | 5/2019 | Lu | G06K 9/4628 |
| | | | | 382/157 |

OTHER PUBLICATIONS

"Surprise!", [Online] Retrieved from the Internet: <https://www.snap.com/en-US/news/post/surprise>, (Oct. 3, 2013), 1 pg.

Buscemi, Scott, "Snapchat introduces 'Stories', a narrative built with snaps", [Online] Retrieved from the Internet: <https://9to5mac.com/2013/10/03/snapchat-introduces-stories-a-narrative-built-with-snaps/>, (Oct. 3, 2013), 2 pgs.

(Continued)

Primary Examiner — Jeanette J Parker

(74) Attorney, Agent, or Firm — Schwegman Lundberg & Woessner, P.A.

(57) ABSTRACT

A system to generate a graphical user interface (GUI) to display presentations of media collections associated with a user profile are described. Embodiments of the present disclosure relate generally to systems for generating and causing display of a GUI that comprises a presentation of a user profile associated with a user, wherein the presentation includes a user identifier of the user, and a display of one or more media collections that comprises media items generated by the user.

20 Claims, 12 Drawing Sheets

(56) References Cited

OTHER PUBLICATIONS

Etherington, Darrell, "Snapchat Gets its own Timeline With Snapchat Stories, 24-Hour Photo and Video Tales", [Online] Retrieved from the Internet: <https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <https://www.theverge.com/2013/10/3/4791934/snapchats-next-big-thing-stories-that-dont-just-disappear>, (Oct. 3, 2013), 5 pgs.

* cited by examiner

400

CAUSING DISPLAY OF A GUI THAT COMPRISES A PRESENTATION OF A USER PROFILE ASSOCIATED WITH A USER, THE PRESENTATION INCLUDING A USER IDENTIFIER OF THE USER AND A DISPLAY OF A MEDIA COLLECTION
402

RECEIVING A REQUEST TO ADD A NEW MEDIA ITEM TO THE MEDIA COLLECTION, THE NEW MEDIA ITEM COMPRISING AT LEAST IMAGE DATA
404

GENERATING A VISUAL REPRESENTATION OF THE NEW MEDIA ITEM IN RESPONSE TO THE RECEIVING THE REQUEST TO ADD THE NEW MEDIA ITEM TO THE MEDIA COLLECTION
406

UPDATING THE USER IDENTIFIER OF THE USER BASED ON THE VISUAL REPRESENTATION OF THE NEW MEDIA ITEM
408

```
RECEIVING A SELECTION OF A MEDIA ITEM FROM AMONG THE SET OF
MEDIA ITEMS AMONG THE DISPLAY OF THE MEDIA COLLECTION
502
```

```
CAUSING DISPLAY OF STATISTICS CORRESPONDING TO THE MEDIA ITEM
IN RESPONSE TO THE RECEIVING THE SELECTION OF THE MEDIA ITEM
504
```

RETRIEIVING STATISTICS CORRESPONDING TO EACH MEDIA ITEM AMONG THE SET OF MEDIA ITEMS
602

PRESENTING AN INDICATION OF THE STATISTICS OF EACH MEDIA ITEM AMONG THE SET OF MEDIA ITEMS WITHIN THE DISPLAY OF THE MEDIA COLLECTION
604

RECEIVING A LOGIN CREDENTIAL AT A CLIENT DEVICE, THE LOGIN CREDENTIAL CORRESPONDING TO THE USER PROFILE OF THE USER
702

CAUSING DISPLAY OF THE GRAPHICAL USER INTERFACE THAT COMPRISES THE PRESENTATION OF THE USER PROFILE ASSOCIATED WITH THE USER THAT INCLUDES THE DISPLAY OF THE MEDIA COLLECTION THAT CORRESPONDS WITH THE USER PROFILE
704

*FIG. 7*

INTERFACE TO DISPLAY MEDIA COLLECTIONS

TECHNICAL FIELD

Embodiments of the present disclosure relate generally to graphical user interfaces (GUI), and more particularly, to systems for generating and causing display of GUIs.

BACKGROUND

Mobile devices can be used to view media content, such as videos and images generated by users. Locating desired content to view or otherwise access often involves a number of non-intuitive user interactions and selections. Specially configured graphical user interfaces (GUI) are easier to use and navigate than command line interfaces.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating a method for generating and causing display of an interface to display a media collection, according to certain example embodiments.

FIG. 5 is a flowchart illustrating a method for generating and causing display of an interface to display a media collection, according to certain example embodiments.

FIG. 6 is a flowchart illustrating a method for generating and causing display of an interface to display a media collection, according to certain example embodiments.

FIG. 7 is a flowchart illustrating a method for generating and causing display of an interface to display a media collection, according to certain example embodiments.

DETAILED DESCRIPTION

Figure 1:
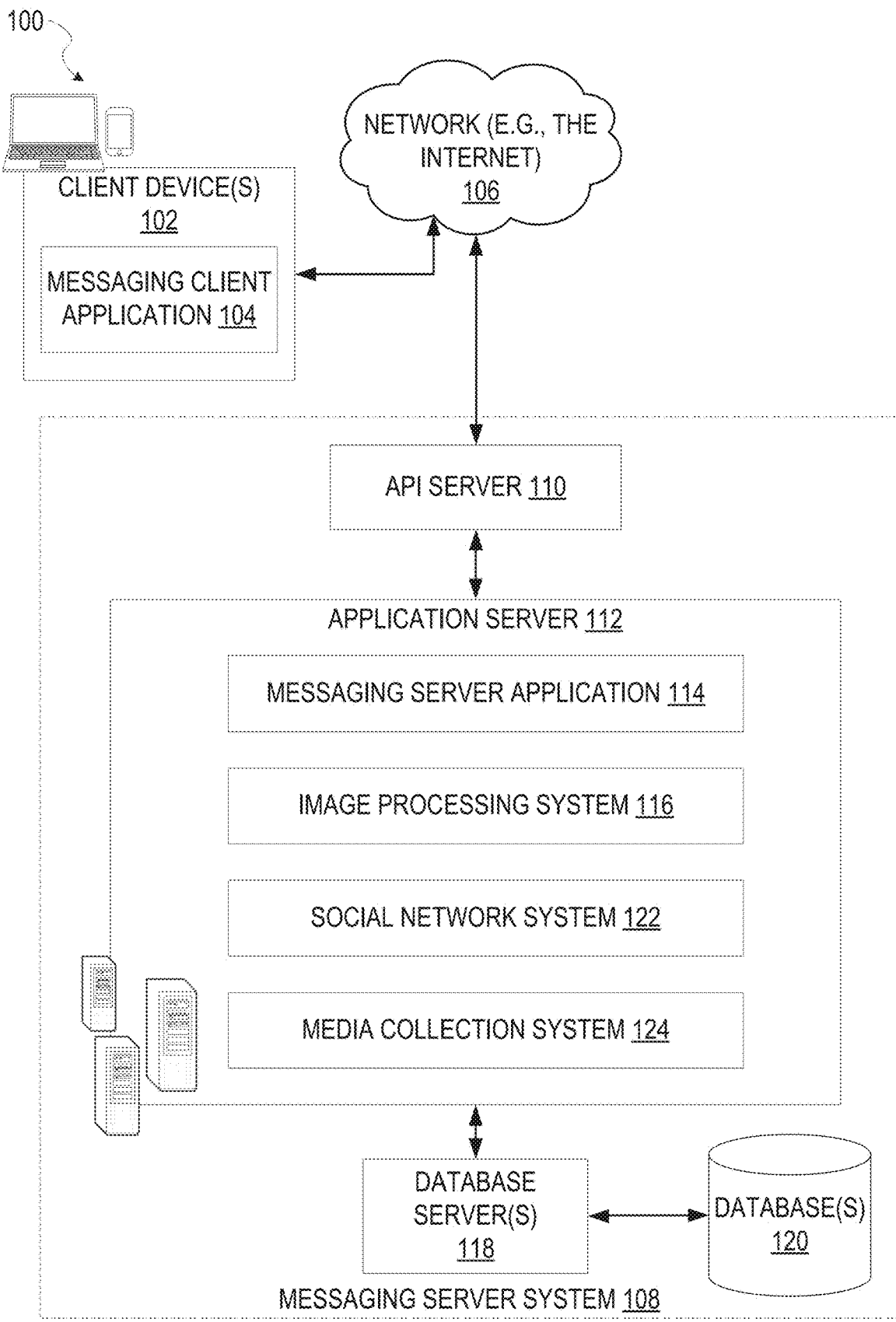
FIG. 1 is a block diagram showing an example messaging system for exchanging data (e.g., messages and associated content) over a network in accordance with some embodiments, wherein the messaging system includes a media collection system.

System to generate a graphical user interface (GUI) to display presentations of media collections associated with a user profile are described. Embodiments of the present disclosure relate generally to systems for generating and causing display of a GUI that comprises a presentation of a user profile associated with a user, wherein the presentation includes a user identifier of the user, and a display of one or more media collections that comprises media items generated by the user.

A media collection comprises a grouping of media items that may or may not be related to one another based on certain attributes. For example, a media collection may comprise a grouping of media items generated at a specific location or time, or by a specific user or group of users. By accessing a media collection, the system may present a sequential curated display of the corresponding grouping of media items, where one media item after another is presented for a predefined period of time.

The one or more media collections may be organized based on attributes of the corresponding sets of media items. For example, a first media collection presented within the GUI may comprise media items generated exclusively by the user, while a second media collection presented within the GUI may correspond to media items generated by a plurality of users. Attributes may also include geo-location attribute, as well as temporal attributes.

In some embodiments, a media collection may be displayed as an arrangement of graphical elements (e.g., tiles) that identify and represent each of the media items that comprise the media collection. For example, a media collection that comprises a set of 10 media items may be represented as a display of 10 graphical elements, wherein each graphical element identifies a media item from among the set of 10 media items. In some embodiments, a sorting or spatial arrangement of the graphical elements in the presentation of the media collection within the GUI defines display instructions for the media collection, such that the media items are displayed sequentially based on the sorting or spatial arrangement.

In some embodiments, the system may retrieve statistics, such as a view count, associated with the media items of the one or more media collections and present a display of the statistics within the presentation of the media collection. For example, the system may display statistics of the media collection itself, as well as more specific statistics related to each of the media items.

In some embodiments, the system may receive a request to add a new media item to a media collection among the one or more media collections. For example, the user may generate a media item and provide an input that selects a media collection from among the display of the one or more media collections. In response, the system adds the new media item to the selected media collection. In some embodiments, the user may provide an additional input to define a position of the media item within the presentation of the media collection, such that the position of the media item defines when the media item will appear in the media collection when the media collection is viewed.

In some embodiments, the user identifier displayed within the GUI may be based on a media item from among the set of media items of one or more of the media collections, such as the most recently added media item among the media collections, or in some embodiments, the media item displayed at a particular position within the presentation of a media collection in the GUI. In response to receiving the request to add the new media item, the system may generate a visualization of the media item, and update the user identifier based on the visualization.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a media collection system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
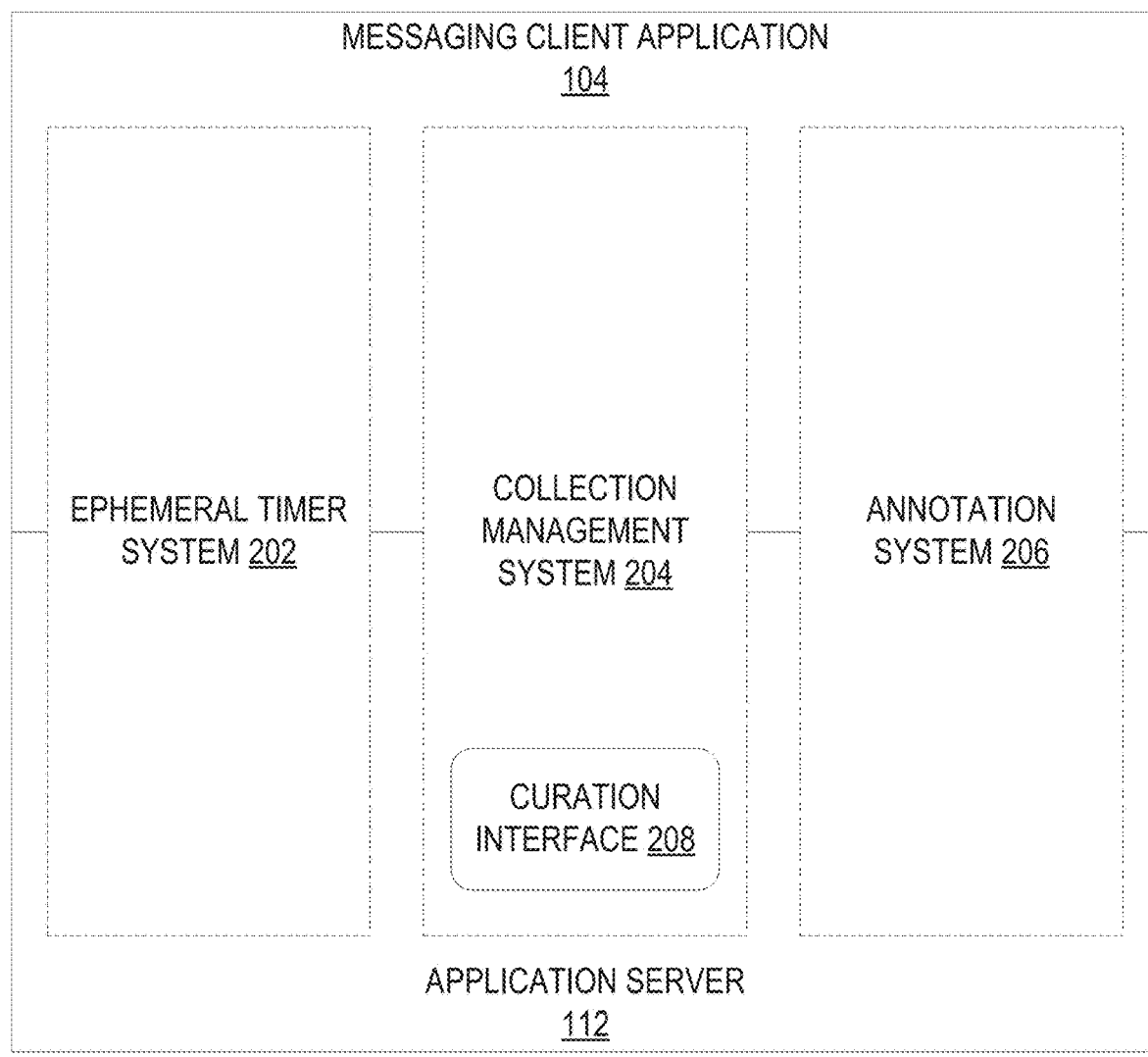
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
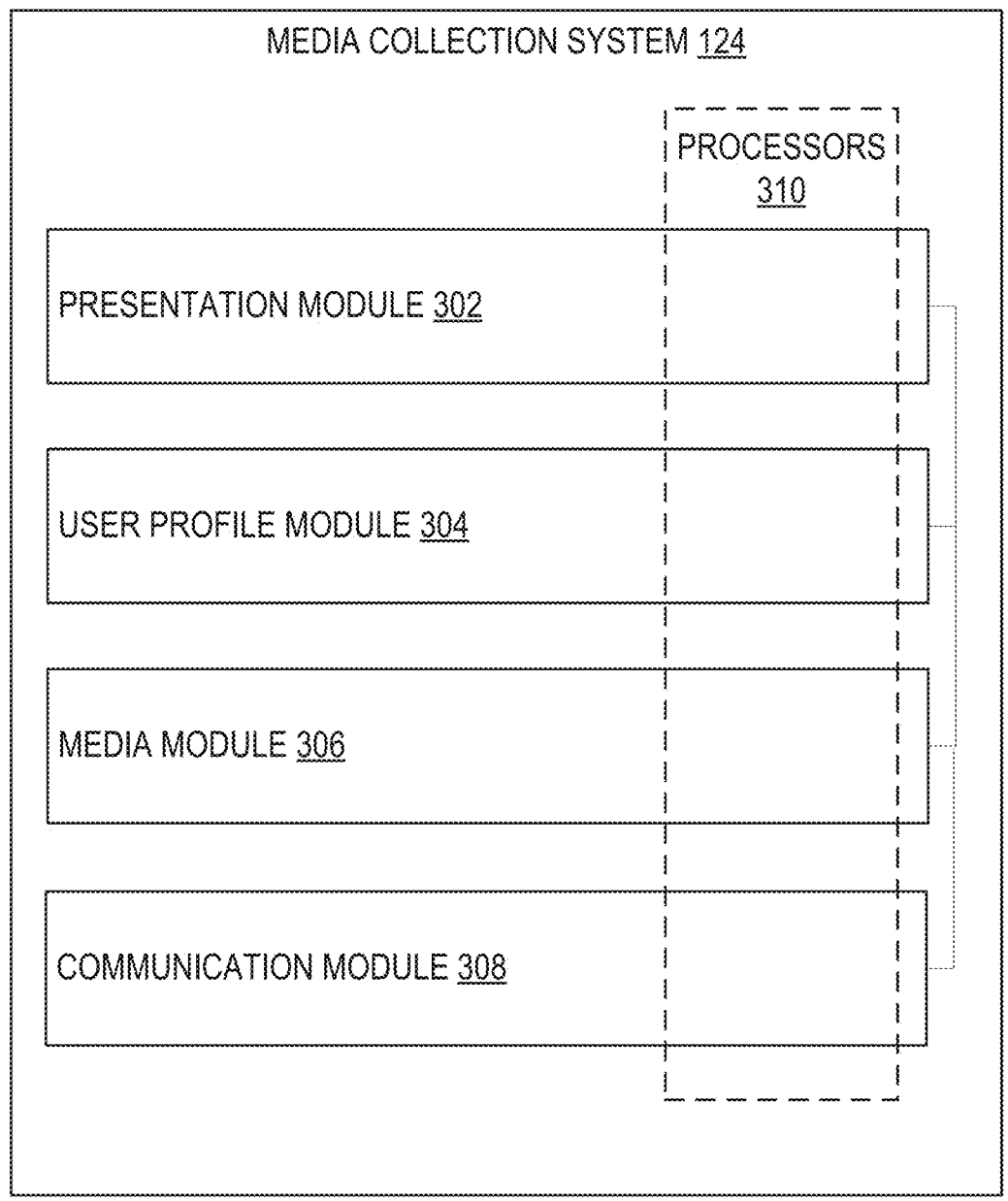
FIG. 3 is a block diagram illustrating various modules of a media collection system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the media collection system 124 that configure the media collection system 124 to generate and cause display of a GUI that includes a presentation of a media collection associated with a user, according to some example embodiments. The media collection system 124 is shown as including a presentation module 302, a user profile module 304, a media module 306, and a communication module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the media collection system 124 may physically include an arrangement of one or more of the processors 310 (e.g., a subset of or among the one or more processors of the machine) configured to perform the operations described herein for that module. As another example, any module of the media collection system 124 may include software, hardware, or both, that configure an arrangement of one or more processors 310 (e.g., among the one or more processors of the machine) to perform the operations described herein for that module. Accordingly, different modules of the media collection system 124 may include and configure different arrangements of such processors 310 or a single arrangement of such processors 310 at different points in time. Moreover, any two or more modules of the media collection system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating a method 400 for generating and causing display of an interface to display a media collection associated with a user profile at a client device (e.g., client device 102), according to certain example embodiments. Operations of the method 400 may be performed by the modules described above with respect to FIG. 3. As shown in FIG. 4, the method 400 includes one or more operations 402, 404, 406, and 408.

At operation 402, the presentation module 302 causes display of a GUI that comprises a presentation of a user profile associated with a user, the presentation including a user identifier of the user and a display of one or more media collections associated with the user.

The user identifier may for example comprise a display of a username and a graphical icon. In some embodiments, the one or more media collections may be displayed as an arrangement of graphical icons (e.g., tiles), wherein each graphical icon corresponds to a media item of the media collection. For example, FIG. 9 includes an illustration of a GUI 900 that includes a display of a user identifier 905, and media collections 910 and 915.

At operation 404, the media module 306 receives a request to add a new media item to the media collection, wherein the new media item includes at least image data. For example, a user of a client device 102 may create media content by capturing or recording an image or video, and editing the image or video at the client device 102. The media content may therefore include certain attributes, such as metadata that identifies a location or time (e.g., geolocation data, timestamp), as well as a source of the media content (e.g., the user, the client device 102).

Figure 9:
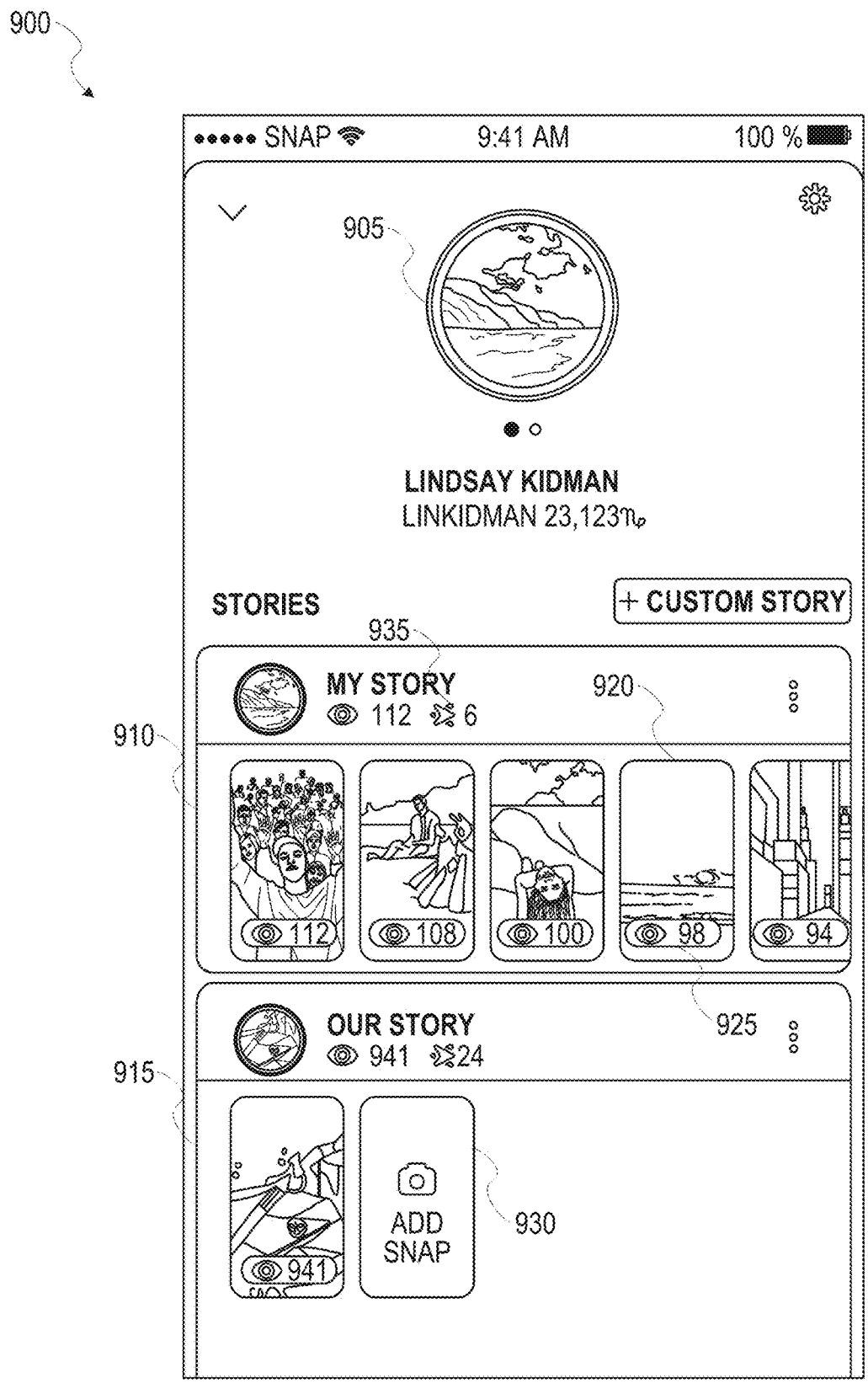
FIG. 9 is an interface diagram depicting a GUI to display a media collection, according to certain example embodiments.

In some embodiments, the request may additionally include an identification of a media collection from among the one or more media collections presented within the GUI (e.g., media collection 910 or 915 of FIG. 9). In further embodiments, the media module 306 may select an appropriate media collection to add the new media item based on the attributes of the media item itself.

At operation 406, the media module 306 generates a visual representation of the new media item in response to the receiving the request to add the new media item to the media collection. The visual representation may for example be based on image data of the media item. For example, in instances where the media item is a video, the visual representation may be based on the first frame of the video, or first few frames of the video. In some embodiments, the visual representation may be a Graphics Interchange Format image (GIF) based on a portion of the video (e.g., ⅛ of the video, the first 5 seconds of the video, the first 10 frames of the video).

At operation 408, the user profile module 304 updates the user identifier of the user based on the visual representation of the new media item generated by the media module 306, in response to the receiving the request to add the new media item to the media collection.

FIG. 5 is a flowchart illustrating a method 500 for generating and causing display of an interface to display a media collection at a client device 102, according to certain example embodiments. Operations of the method 500 may be performed by the modules described above with respect to FIG. 3. As shown in FIG. 5, the method 500 includes one or more operations 502, and 504.

At operation 502, the media module 306 receives a selection of a media item from among the set of media items of a media collection. For example, with reference to the GUI 90 of FIG. 9, a user of the client device 102 may provide a tactile input into the GUI 900 that selects the media item 920 from among the media collection 910.

In response to the media module 306 receiving the selection of the media item, at operation 504, the presentation module 302 causes display of statistics that corresponds to the selected media item (e.g., media item 920). For example, the statistics may include a view count indicating a number of users that have viewed or received the media item. In some embodiments, in response to receiving the selection, the presentation module 302 may cause display of the media item within the GUI.

FIG. 6 is a flowchart illustrating a method 600 for generating and causing display of an interface to display a media collection at a client device 102, according to certain example embodiments. Operations of the method 600 may be performed by the modules described above with respect to FIG. 3. As shown in FIG. 6, the method 600 includes one or more operations 602, and 604.

At operation 602, the media module 306 retrieves statistics corresponding to each media item among the sets of media items that comprises the one or more media collections. In some embodiments, the media module 306 may retrieve the statistics for each media item in response to receiving a request to display the GUI 900 at the client device 102. For example, as discussed in FIG. 7, the communication module 308 may receive login credentials of a user. In response to receiving the login credentials, the media module 306 mat retrieve the statistics that corresponds to media collections and media items associated with the user.

At operation 604, the presentation module 302 causes display of an indication of the statistics of each media item that comprise the media collections. For example, as seen in the GUI 900 of FIG. 9, the display of the media item 920 includes an indication of statistics 925. As seen in FIG. 9, the statistics 925 may include a view count of the media item 920, wherein the view count indicates a number of times that the media item 920 has been viewed or otherwise accessed.

FIG. 7 is a flowchart illustrating a method 700 for generating and causing display of an interface to display a media collection at a client device 102, according to certain example embodiments. Operations of the method 700 may be performed by the modules described above with respect to FIG. 3. As shown in FIG. 7, the method 700 includes one or more operations 702, and 704. In some embodiments, the method 700 may be performed as a precursor to the method 400 of FIG. 4.

At operation 702, the communications module 308 receives a login credential at the client device 102. The login credential may for example comprise a user name or user identifier and a password or encryption key.

At operation 704, in response to the communications module 308 receiving the login credential at the client device 102, the presentation module 302 generates and causes display of a GUI that comprises the presentation of the user profile associated with the use corresponding to the login credential, and includes the display of the one or more media collections associated with the user profile, as depicted in the GUI 900 of FIG. 9.

Figure 8:
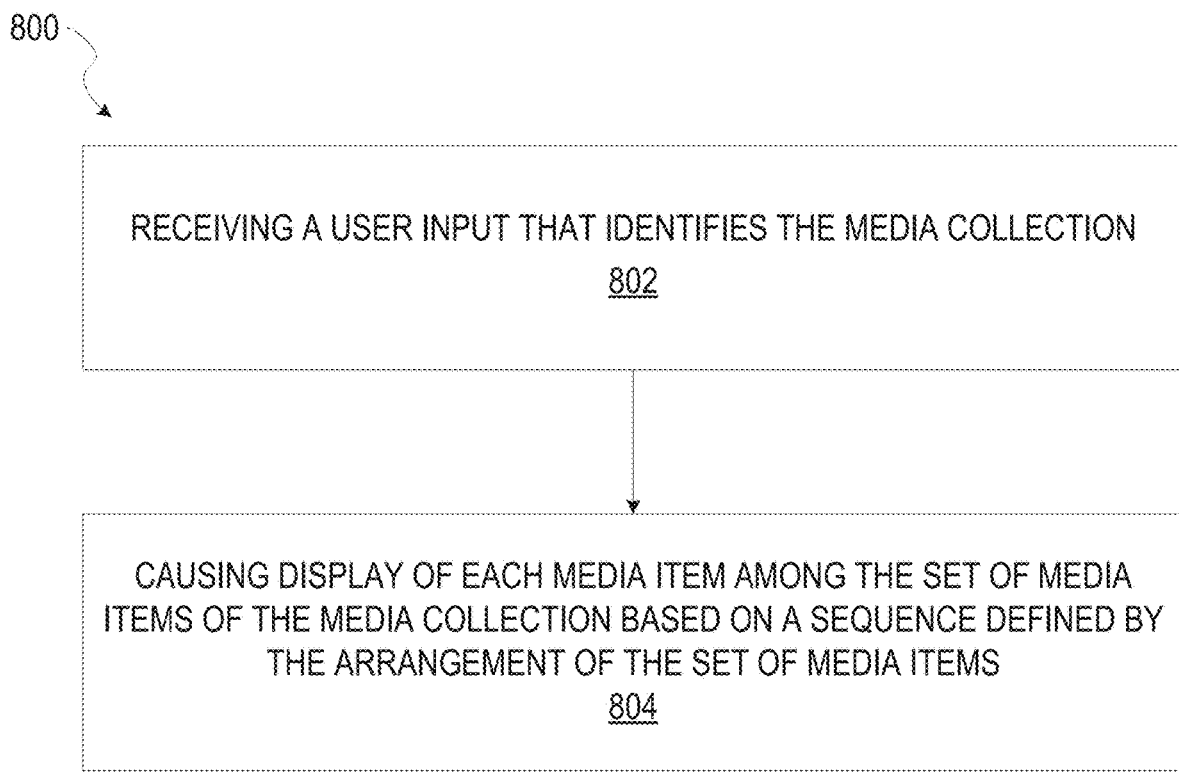
FIG. 8 is a flowchart illustrating a method for generating and causing display of an interface to display a media collection, according to certain example embodiments.

FIG. 8 is a flowchart illustrating a method 800 for generating and causing display of an interface to display a media collection at a client device 102, according to certain example embodiments. Operations of the method 800 may be performed by the modules described above with respect to FIG. 3. As shown in FIG. 8, the method 800 includes one or more operations 802, and 804.

In some embodiments, the arrangement of the set of media items of a media collection define a presentation sequence of the set of media items that correspond to the media collection.

At operation 802, the media module 306 receives a user input that identifies a media collection. For example, the user input may comprise a tactile input received at the client device 102 that selects the media collection from within the GUI (e.g., the GUI 900 of FIG. 9).

At operation 804, in response to receiving the user input that identifies the media collection, the presentation module 302 causes display of each media item among the set of media items that correspond to the media collection based on a sequence defined by an arrangement of the set of media items. In some embodiments, a user may provide inputs to rearrange or change the sort order of the arrangement. By doing so, the sequence in which the set of media items of the media collection are presented may be changed.

FIG. 9 is an interface diagram depicting a GUI 900 to display a media collection (e.g., the media collections 910 and 915), according to certain example embodiments, and as discussed in the method 400 of FIG. 4. As seen in FIG. 9, the GUI 900 includes a presentation of a user profile that comprises a display of a user identifier 905, and the media collections 910 and 915, wherein the media collections comprise sets of media items, such as the media item 920.

In some embodiments, the GUI 900 may be accessible by a user via a network (such as the network 106), through a client device 102. For example, the user may login to a corresponding user account by providing credentials to the media collection system 124. In response to receiving the credentials from the client device 102 (via the network 106), the media collection system 124 may generate and cause display of the GUI 900 at the client device 102.

As discussed above, the media collections 910 and 915 may comprise a set of media items that include ephemeral media items, wherein the ephemeral timer system 202 is responsible for enforcing temporary access to the ephemeral media items. For example, each media item among the collection of media items 910 and 915 may have its own corresponding access and display parameters governed by the ephemeral timer system 202.

In some embodiments, the media collections 910 and 915 may be organized based on attributes of the corresponding media items. For example, media collection 910 may comprise a set of media items generated exclusively by the user identified by the user identifier 905, whereas the media collection 915 may comprise a set of media items generated by a plurality of users that may or may not include the user identified by the user identifier 905.

In some embodiments, the GUI 900 may also include one or more icons 930 displayed among the media items that correspond with a media collection, to receive a user input to add a media item to a media collection. For example, a user may add a media item to a media collection, such as the media collection 915, by providing an input that selects the icon 930.

In some embodiments, the display of the media items, such as the media item 920, may include an indication of statistics 925 associated with the media item. In further embodiments, the media collections themselves, such as the media collection 910, may include an indication of collection statistics 935 that include a view count, as well as a number of times that the media collection has been shared with another user.

Figure 10:
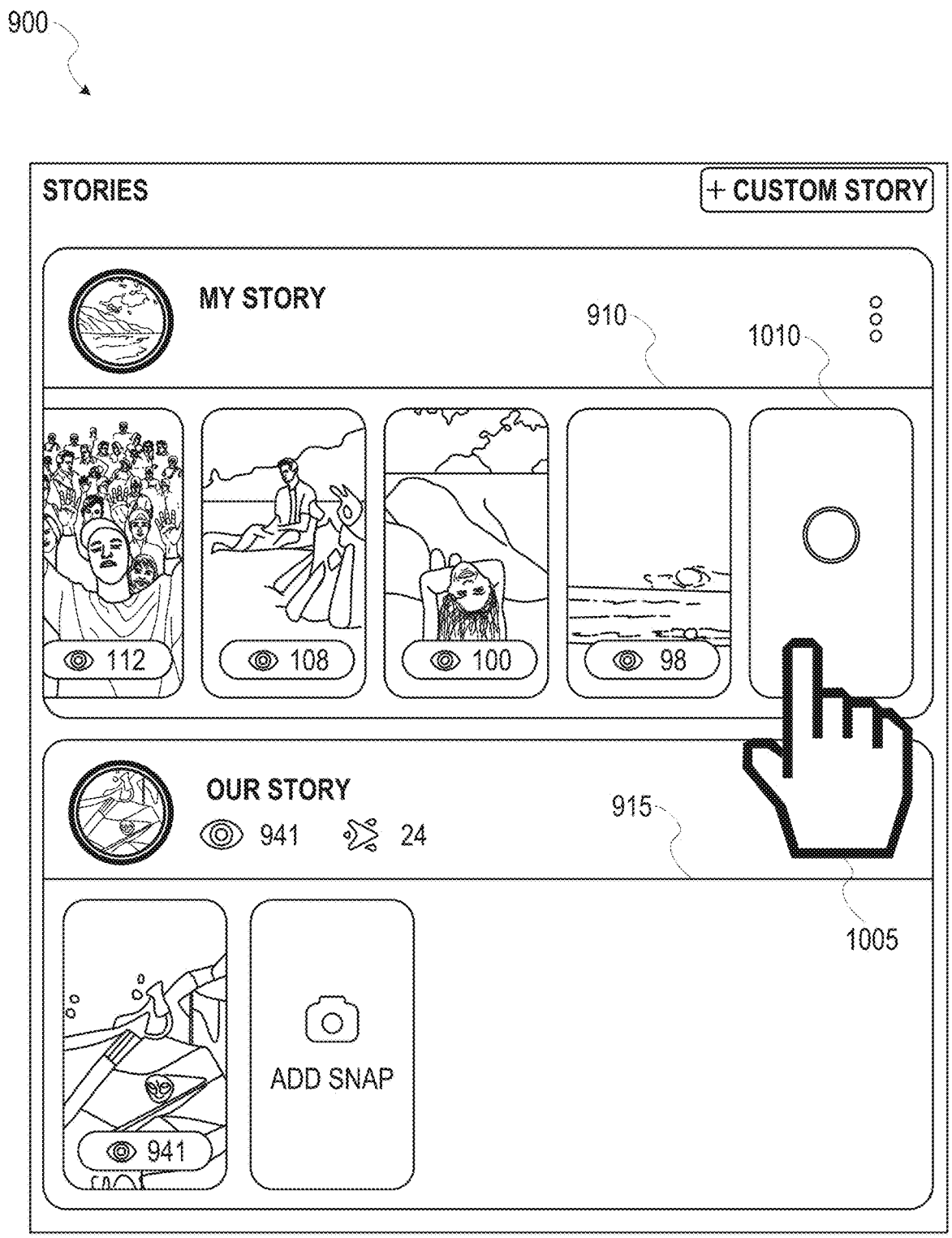
FIG. 10 is an interface diagram depicting a GUI to display a media collection, according to certain example embodiments.

FIG. 10 is an interface diagram depicting the GUI 900 (as seen in FIG. 9) to display a media collection at a client device 102, according to certain example embodiments.

As seen in FIG. 10, a user may provide an input 1005 that selects media item 1010. In response, as discussed in the method 500 of FIG. 5, the presentation module 302 causes display of statistics corresponding to the media item 1010.

A user may select a media item (such as the media item 1010) via the input 1005, and drag and drop the media item 1010 at any position among the arrangement of the set of media items of the corresponding media collection, or a different media collection altogether. By doing so, the user may either move the media item to a different media collection, or may simply change a temporal location of the media item in a presentation sequence of the set of media items, based on the position of the media item among the arrangement of the set of media items. In some embodiments, dragging and dropping the media content from the media collection 910 to the media collection 915 may simply duplicate the media content into the media collection 915. In further embodiments, dragging and dropping the media content from the media collection 910 to the media collection 915 may cause the media content to be removed from the media collection 910 and added to the media collection 915.

Multiple media collections may be displayed simultaneously within a single GUI 900. For example, as seen in both FIG. 9 and FIG. 10, two separate media collections (i.e., media collection 910 and 915), which are each be separately maintained and curated by a user, are presented contemporaneously within a single GUI 900. In some embodiments, the media collections 910 and 915 may be displayed such that the corresponding media items are presented horizontally, such that a user may scroll through a media collection (e.g., the media collection 910) horizontally, and may view separate media collections (e.g., the media collection 915) by scrolling vertically.

Software Architecture

Figure 11:
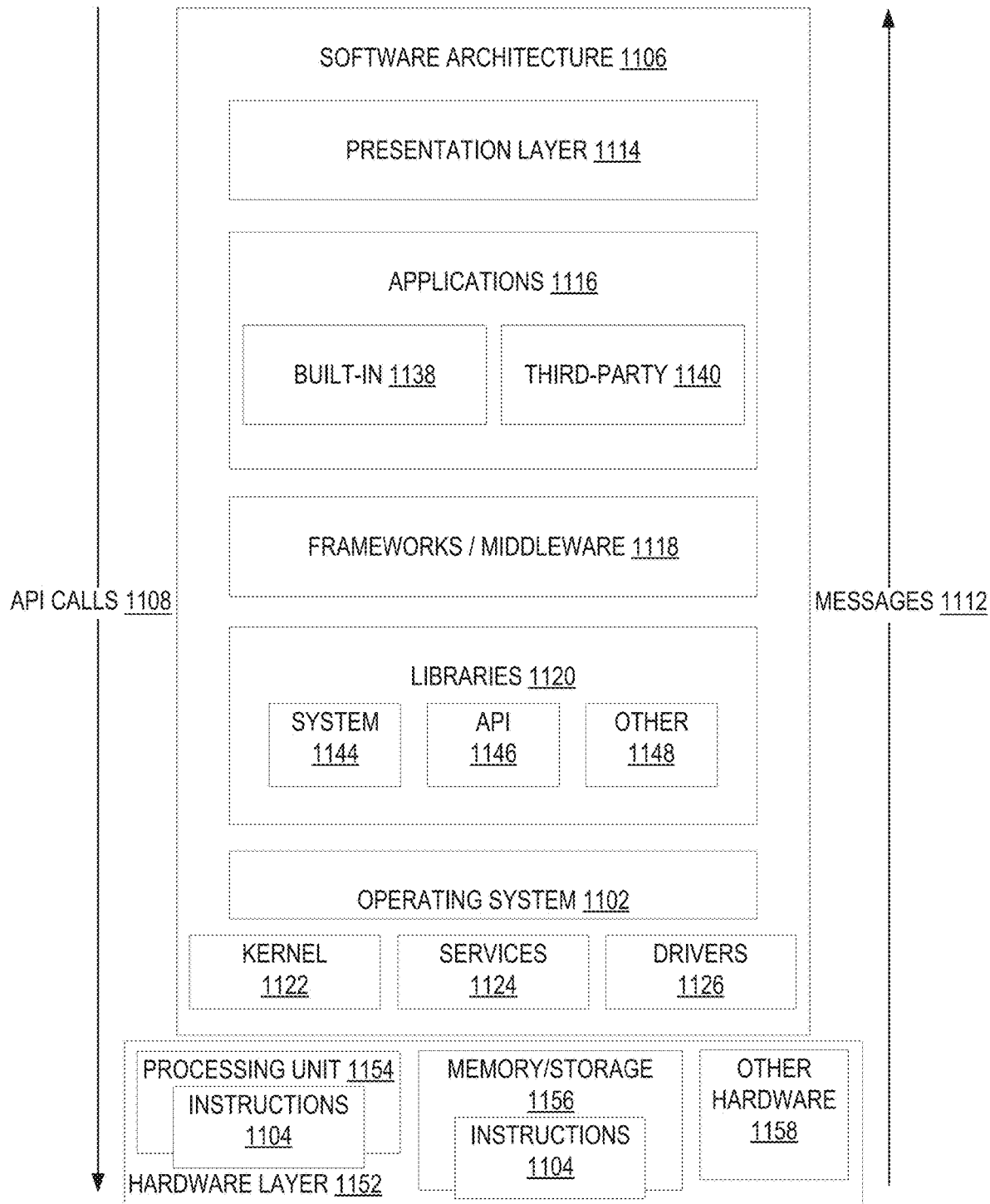
FIG. 11 is a block diagram illustrating a representative software architecture, which may be used in conjunction with various hardware architectures herein described and used to implement various embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as the machine 1200 of FIG. 12 that includes, among other things, processors 1204, memory 1214, and I/O components 1218. A representative hardware layer 1152 is illustrated and can represent, for example, the machine 1100 of FIG. 11. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers.

The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Figure 12:
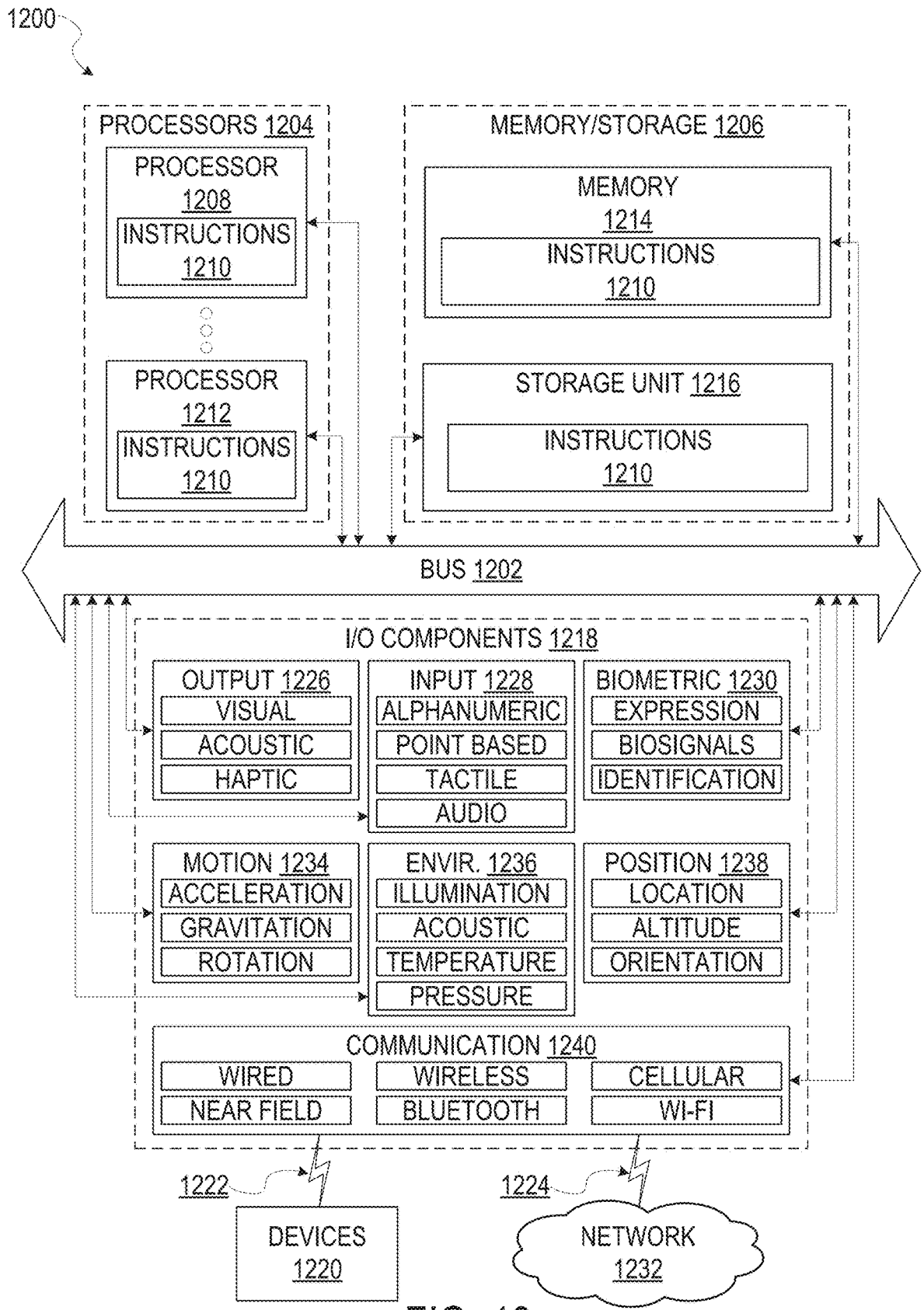
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor of other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    causing display of a graphical user interface that comprises a presentation of a user profile associated with a user, the presentation of the user profile including a display of a user identifier of the user, and a set of media collections associated with the user, each media collection among the set of media collections comprising an arrangement of a set of media items associated with an attribute from among a plurality of attributes;
    receiving a new media item from a client device, the new media item including a video that comprises a media attribute and a plurality of frames, the media attribute including an identifier of the client device;
    selecting a set of frames from among the plurality of frames of the new media item, the set of frames corresponding with a predefined portion of the video;
    generating a visual representation of the new media item based on the set of frames that correspond with the predefined portion of the video, the visual representation including a Graphics Interchange Format (GIF) image;
    selecting a media collection from among the set of media collections based on the attribute of the new media item that comprises the identifier of the client device, the media collection corresponding with a user group that includes a user associated with the client device;
    receiving an input that places the visual representation of the new media item at a position among the arrangement of the set of media items that correspond with the media collection;
    presenting the GIF image of the new media item at the position within the arrangement of the set of media items associated with the media collection based on the input; and
    updating the user identifier of the user displayed within the user profile based on the GIF image of the new media item responsive to the input that places the visual representation of the new media item among the arrangement of the set of media items.

2. The method of claim 1, wherein the presenting the GIF image of the new media item at the position among the arrangement includes:
    displaying the visual representation of the new media item at the position among the arrangement of the set of media items based on the input.

3. The method of claim 1, wherein the method further comprises:
    receiving a selection of a media item from among the set of media items among the display of the media collection; and
    causing display of statistics corresponding to the media item, the statistics including a view count of the media item.

4. The method of claim 1, wherein the method further comprises:
    retrieving statistics corresponding to each of the set of media items, the statistics including view counts of each media item among the set of media items; and
    presenting an indication of the view counts of each media item within the display of the media collection.

5. The method of claim 1, wherein the arrangement of the set of media items defines a sequence of the set of media items within the media collection, and wherein the method further comprises:
    receiving a selection of a user identifier that corresponds with the user profile; and
    presenting the media collection based on the sequence.

6. The method of claim 1, wherein the method further comprises:
    receiving a login credential at a client device, the login credential corresponding to the user profile of the user; and
    causing display of the graphical user interface that comprises the presentation of the user profile associated with the user that includes the display of the media collection in response to the receiving the login credential.

7. The method of claim 1, wherein the media collection is a first media collection, and wherein the method further comprises:
    causing display of the first media collection within a first region of the graphical user interface; and
    causing display of a second media collection within a second region of the graphical user interface, the second media collection comprising a second set of media items that share a common attribute, and wherein the second region of the graphical user interface corresponds to the common attribute.

8. The method of claim 1, wherein the arrangement of the set of media items defines a sequence of the set of media items, and the method further comprises:
    receiving a user input that identifies the media collection; and causing display of each media item among the set of media items of the media collection based on the sequence.

9. A system comprising:
a memory; and
at least one hardware processor coupled to the memory and comprising instructions that causes the system to perform operations comprising:
causing display of a graphical user interface that comprises a presentation of a user profile associated with a user, the presentation of the user profile including a display of a user identifier of the user, and a set of media collections associated with the user, each media collection among the set of media collections comprising an arrangement of a set of media items associated with an attribute from among a plurality of attributes;
receiving a new media item from a client device, the new media item including a video that comprises a media attribute and a plurality of frames, the media attribute including an identifier of the client device;
selecting a set of frames from among the plurality of frames of the new media item, the set of frames corresponding with a predefined portion of the video;
generating a visual representation of the new media item based on the set of frames that correspond with the predefined portion of the video, the visual representation including a Graphics Interchange Format (GIF) image;
selecting a media collection from among the set of media collections based on the attribute of the new media item that comprises the identifier of the client device, the media collection corresponding with a user group that includes a user associated with the client device;
receiving an input that places the visual representation of the new media item at a position among the arrangement of the set of media items that correspond with the media collection;
presenting the GIF image of the new media item at the position within the arrangement of the set of media items associated with the media collection based on the input; and
updating the user identifier of the user displayed within the user profile based on the GIF image of the new media item responsive to the input that places the visual representation of the new media item among the arrangement of the set of media items.

10. The system of claim 9, wherein the presenting the GIF image of the new media item at the position among the arrangement includes:
displaying the visual representation of the new media item at the position among the arrangement of the set of media items based on the input.

11. The system of claim 9, wherein the instructions cause the system to perform operations further comprising:
receiving a selection of a media item from among the set of media items among the display of the media collection; and
causing display of statistics corresponding to the media item, the statistics including a view count of the media item.

12. The system of claim 9, wherein the instructions cause the system to perform operations further comprising:
retrieving statistics corresponding to each of the set of media items, the statistics including view counts of each media item among the set of media items; and
presenting an indication of the view counts of each media item within the display of the media collection.

13. The system of claim 9, wherein the arrangement of the set of media items defines a sequence of the set of media items within the media collection, and wherein the method further comprises:
receiving a selection of a user identifier that corresponds with the user profile; and
presenting the media collection based on the sequence.

14. The system of claim 9, wherein instructions cause the system to perform operations further comprising:
receiving a login credential at a client device, the login credential corresponding to the user profile of the user; and
causing display of the graphical user interface that comprises the presentation of the user profile associated with the user that includes the display of the media collection in response to the receiving the login credential.

15. The system of claim 9, wherein the media collection is a first media collection, and wherein the instructions cause the system to perform operations further comprising:
causing display of the first media collection within a first region of the graphical user interface; and
causing display of a second media collection within a second region of the graphical user interface, the second media collection comprising a second set of media items that share a common attribute, and wherein the second region of the graphical user interface corresponds to the common attribute.

16. The system of claim 9, wherein the arrangement of the set of media items defines a sequence of the set of media items, and the instructions cause the system to perform operations further comprising:
receiving a user input that identifies the media collection; and
causing display of each media item among the set of media items of the media collection based on the sequence.

17. A non-transitory machine-readable storage medium comprising instructions that, when executed by one or more processors of a machine, cause the machine to perform operations comprising:
causing display of a graphical user interface that comprises a presentation of a user profile associated with a user, the presentation of the user profile including a display of a user identifier of the user, and a set of media collections associated with the user, each media collection among the set of media collections comprising an arrangement of a set of media items associated with an attribute from among a plurality of attributes;
receiving a new media item from a client device, the new media item including a video that comprises a media attribute and a plurality of frames, the media attribute including an identifier of the client device;
selecting a set of frames from among the plurality of frames of the new media item, the set of frames corresponding with a predefined portion of the video;
generating a visual representation of the new media item based on the set of frames that correspond with the predefined portion of the video, the visual representation including a Graphics Interchange Format (GIF) image;
selecting a media collection from among the set of media collections based on the attribute of the new media item that comprises the identifier of the client device, the media collection corresponding with a user group that includes a user associated with the client device;

receiving an input that places the visual representation of the new media item at a position among the arrangement of the set of media items that correspond with the media collection;

presenting the GIF image of the new media item at the position within the arrangement of the set of media items associated with the media collection based on the input; and updating the user identifier of the user displayed within the user profile based on the GIF image of the new media item responsive to the input that places the visual representation of the new media item among the arrangement of the set of media items.

18. The non-transitory machine readable storage medium of claim 17, wherein the presenting the GIF image of the new media item at the position among to the arrangement of the set of media items includes:

displaying the visual representation of the new media item at the position among the arrangement of the set of media items within the graphical user interface, the position based on the input.

19. The non-transitory machine readable storage medium of claim 17, wherein the instructions cause the machine to perform operations further comprising:

receiving a selection of a media item from among the set of media items among the display of the media collection; and causing display of statistics corresponding to the media item, the statistics including a view count of the media item.

20. The non-transitory machine readable storage medium of claim 17, wherein the instructions cause the machine to perform operations further comprising:

retrieving statistics corresponding to each of the set of media items, the statistics including view counts of each media item among the set of media items; and presenting an indication of the view counts of each media item within the display of the media collection.

\* \* \* \* \*